(No Model.) 2 Sheets—Sheet 2.
A. DELANEY & J. M. BOND.
SAW MILL DOG.
No. 325,507. Patented Sept. 1, 1885.
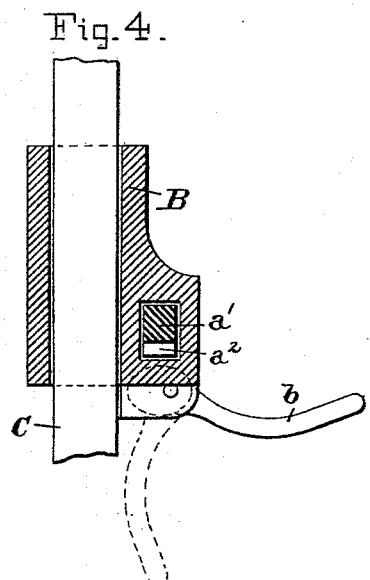
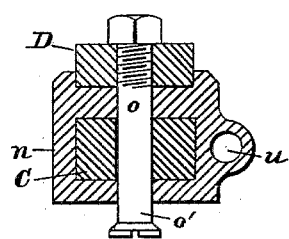
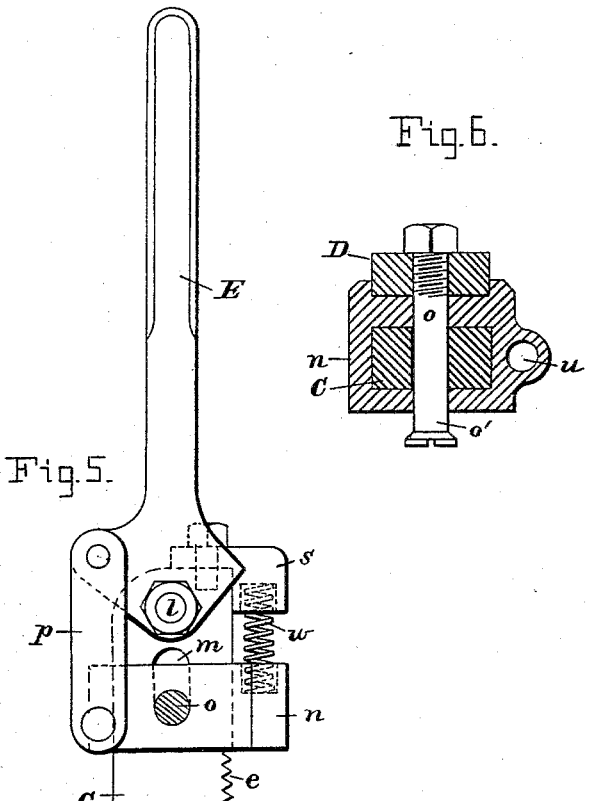
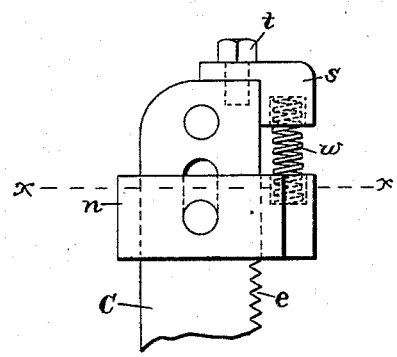
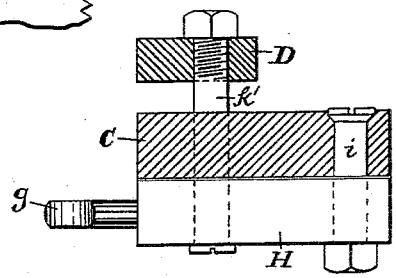
WITNESSES:
A. C. Eader
John E. Morris
INVENTORS:
Alexander Delaney
John M. Bond
By Chas B. Mann
Attorney.

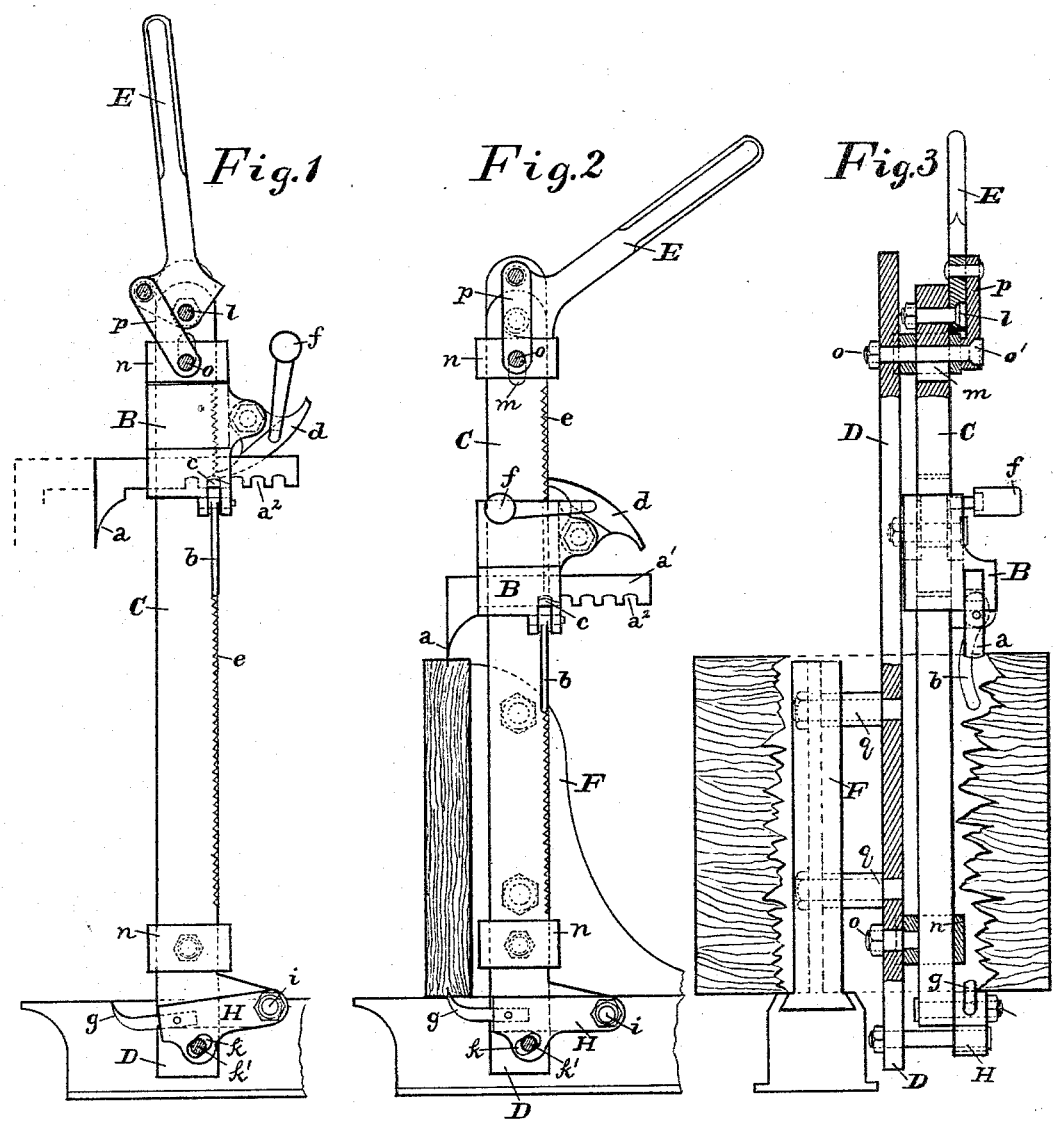

United States Patent Office.

ALEXANDER DELANEY AND JOHN M. BOND, OF RICHMOND, VIRGINIA.

SAW-MILL DOG.

SPECIFICATION forming part of Letters Patent No. 325,507, dated September 1, 1885.

Application filed March 11, 1885. (No model.)

*To all whom it may concern:*

Be it known that we, ALEXANDER DELANEY and JOHN M. BOND, citizens of the United States, residing at Richmond, in the county of Henrico and State of Virginia, have invented certain new and useful Improvements in Saw-Mill Dogs, of which the following is a specification.

Our invention relates to improved mechanism for operating saw-mill dogs.

The object of our invention is to provide an improved dog adapted for holding a board, and to so construct its operating mechanism that its movements shall be positive.

The invention is illustrated in the accompanying drawings, in which Figure 1 is a side elevation of the board-dog with the dog-bits in position as when out of action. Fig. 2 is a side elevation of the board-dog, showing the dog-bits brought into action and holding a board. Fig. 3 is a front view of the board-dog, showing some of the parts in section and a board broken away to expose the dog. Fig. 4 is the sliding bit-carrier, showing cam-lever in two positions. Fig. 5 is a top end view of vertical movable slide-bar, showing top band, lever, and link. Fig. 6 is a cross-section of parts on the line $x$, Fig. 7. Fig. 7 is a view of the upper end of vertical movable slide-bar, bracket, and spring. Fig. 8 is a view of lower dog-bit and carrier, and cross-section of slide bar.

The dog is arranged to grasp the board both above and below. To this end we provide two dog-bits, the upper one, $a$, of which enters by a downward movement, and the lower one, $g$, by an upward movement, which movements are effected simultaneously by shifting a single lever. The upper dog-bit, $a$, is attached to a shank, $a'$, which fits and may be moved endwise in a carrier, B, so attached to a slide-bar, C, as to admit of sliding up and down thereon. The carrier B has a lever-cam, $b$, pivoted thereto, and works in a slot, $c$, in such manner that when the lever is down the cam part in the slot will engage with the shank $a'$ of the dog-bit and secure it from movement. By means of the shank moving endwise in the carrier and the lever-cam to hold it, the dog-bit $a$ may be adjusted laterally to suit boards or timber of any thickness. The shank $a'$ has notches $a^2$, and the cam part of the lever-cam may engage with any one of these notches. When thus arranged, it is impossible for the dog-bit to slip. It will thus be seen that provision is made for the upper dog-bit to be adjusted on the slide-bar C both vertically and laterally.

The sliding bit-carrier B may be held in any desired vertical position on the bar C by means of a reversible pawl, $d$, pivoted on the carrier, said pawl having two ends, either one of which may act against the ratchet-teeth $e$ on one edge of the said bar. The reversible pawl has attached at one side a crank-shaped handle, $f$, which also serves as a weight. This weight tumbles when the pawl is reversed, and serves to hold either end of the pawl in contact with the ratchet-teeth on the bar.

The lower dog-bit, $g$, has its shank or carrier pivoted at the lower end of the movable vertical slide-bar C, and the construction is such that between the pivoted end and bit end it has a bearing or rest, whereby when the vertical slide-bar is moved down the said bearing or rest of the lower dog acts as a fulcrum, on which the dog tilts and causes the bit to move upward.

As shown in the drawings, the lower dog-bit, $g$, is fixed at one end of a carrier, H, the opposite end of which is pivoted on a bolt, $i$, projecting laterally from a foot, $i'$, which extends sidewise at the bottom of the vertical slide-bar C. This carrier H has a short slot, $k$, extending across obliquely, and a pin, $k'$, fixed in the stationary bar D and projecting laterally under the slide-bar, occupies the slot in the dog-bit carrier. This pin $k'$ is the bearing or rest on which the lower dog tilts as on a fulcrum. The short oblique slot $k$ in the pivoted bit-carrier allows of the requisite play when the slide-bar C moves up and down.

The upper and lower ends of the vertical slide-bar C are in guides which hold it sidewise, but permit it to move up and down. These guides are here shown as consisting of the bands $n$ $n$, which surround the slide-bar, and each of said bands is secured to the stationary bar D by means of a stud, $o$. In the case of the upper band the stud $o$ passes entirely through the band $n$ and through a slot, $m$, in the slide-bar C. This arrangement of slot and stud projecting through serves to limit the up and down movement of the slide-bar C, and also affords means on the outer side for the attachment of an actuating-lever, as hereinafter described.

It will thus be seen the upper dog-bit, $a$, is in a carrier, B, which is adjustable up and down on the vertical slide-bar C, and that the lower dog-bit, $g$, is in a carrier, H, which is pivoted to the said vertical slide-bar and fulcrumed to work as a lever, and that the vertical slide-bar itself is movable up and down, which movement actuates both dog-bits and forces them into the board, and also retracts them.

The vertical slide-bar C, and consequently the dog-bits, are actuated by a lever, E, pivoted by a bolt, $l$, directly to the vertical slide-bar. A link, $p$, has one end pivoted on the outer projecting end, $o'$, of upper stud, $o$, and the other end on the said lever.

The vertical stationary bar D is attached by means of bolts $q$ to the usual knee, F, of an ordinary saw-mill head-block, and thereby the dog mechanism is sustained. This dog mechanism can be applied to any kind or size of saw-mill knee.

The operation of this device is as follows: Place the actuating-lever E in a vertical position, as shown in Fig. 1, and then raise the sliding bit-carrier B to the height required by the board or the timber which is to be held, having the lower end of the reversible pawl $e$ in contact with the teeth of the vertical movable slide C, in order to sustain the sliding carrier and upper dog-bit out of the way while the board or timber is being put in position. When the board is in position, lift the pawl $e$ to release it and let the sliding carrier, with upper dog-bit, fall on the board. Next reverse the pawl $e$, so that its upper end will engage with the teeth of the vertical movable slide-bar, and then pull down the lever E to the position shown in Fig. 2. This will force the upper and lower dog-bits firmly into the board or timber, and will hold it securely in position. When the lever E is pulled down, the vertical slide-bar C is moved down, which movement brings down the carrier of upper dog-bit and tilts the lower bit-carrier, $h$, on its fulcrum-pin $k'$, and thereby raises the lower dog-bit.

To release the dog-bits from the timber, it is only necessary to reverse the movements, and the board can then be taken out, leaving the dog again ready for action.

In dogs for large saw-mills we place a spiral or other spring, $w$, as shown in Figs. 5 and 7, between the top band, $n$, and a small bracket, $s$, which is firmly attached to the top of the vertical slide-bar C by means of a set-screw, $t$. The top band, $n$, and the bracket $s$ have each a recess, $u$, to receive the spiral spring $w$. This device is for the purpose of exerting an upward pressure on the vertical slide-bar C, so as to keep the weight of the vertical slide-bar and its attachments from bearing down when the dog is not in action. When the dog is in action, the link $p$, attaching the lever to the bar, is in a vertical position, and the spring $w$ then has no effect to lift on the bar, but acts only when the dog is out of action.

Having described our invention, we claim and desire to secure by Letters Patent of the United States—

1. A saw-mill-dog mechanism having in combination a movable vertical slide-bar, C, provided on one edge with ratchet-teeth, and having at its bottom a foot, $i'$, projecting sidewise, an upper dog-bit supported in a carrier to slide up and down on the bar, and provided with a pawl to engage with the said ratchet-teeth, a stationary bar, D, having guides for the movable slide-bar, and a fixed pin, $k'$, projecting laterally under the said slide-bar, and a lower dog-bit supported in a carrier having one end pivoted to the said projecting foot of the slide-bar and fulcrumed on the said pin under the slide-bar, as set forth.

2. A saw-mill-dog mechanism having in combination a movable vertical slide-bar provided with ratchet-teeth, a dog-bit supported in a carrier to slide on the said bar, and provided with a reversible pawl having two ends, either one of which may act on the said ratchet-teeth, as set forth.

3. A saw-mill-dog mechanism having in combination a movable vertical slide-bar provided with ratchet-teeth, a dog-bit supported in a carrier to slide on the said bar, a reversible pawl having two ends and provided with a tumbling weight to hold either end in contact with the ratchet-teeth, as set forth.

4. A saw-mill-dog mechanism having in combination a movable vertical slide-bar provided with ratchet-teeth, a dog-bit supported in a carrier to slide on the movable bar and provided with a pawl to engage with the ratchet, a stationary bar having guides for the movable bar, a lever pivoted directly to the said movable bar, and a link, $p$, having one end pivoted to a stud on the stationary bar, and the other end pivoted to the said lever, as set forth.

5. A saw-mill-dog mechanism having in combination a movable vertical slide-bar provided with a bracket, $s$, a dog-bit supported in a carrier to slide on the movable bar, a stationary bar having guide-bands for the movable bar, and a spring, $w$, between the said bracket and one of the guide-bands, as set forth.

In testimony whereof we affix our signatures in presence of two witnesses.

ALEXANDER DELANEY.
JOHN M. BOND.

Witnesses:
C. A. DELANEY,
WM. SIMPKIN.